(12) United States Patent
Lee et al.

(10) Patent No.: US 7,427,455 B2
(45) Date of Patent: Sep. 23, 2008

(54) ANODE FOR LITHIUM METAL POLYMER SECONDARY BATTERY COMPRISING SURFACE PATTERNED ANODIC CURRENT COLLECTOR AND METHOD OF PREPARING THE SAME

(75) Inventors: Young Gi Lee, Daejeon (KR); Yong Sik Hong, Daejeon (KR); Yong Joon Park, Daejeon (KR); Kwang Sun Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 282 days.

(21) Appl. No.: 11/231,238

(22) Filed: Sep. 19, 2005

(65) Prior Publication Data

US 2006/0110661 A1   May 25, 2006

(30) Foreign Application Priority Data

Nov. 25, 2004   (KR) ...................... 10-2004-0097475

(51) Int. Cl.
*H01M 4/64* (2006.01)
*H01M 4/72* (2006.01)

(52) U.S. Cl. .................. 429/233; 429/235; 429/236

(58) Field of Classification Search ................ 429/147, 429/129, 233, 235
See application file for complete search history.

(56) References Cited

U.S. PATENT DOCUMENTS

| 5,314,765 | A |   | 5/1994 | Bates |   |
|---|---|---|---|---|---|
| 5,961,672 | A |   | 10/1999 | Skotheim et al. |   |
| 6,093,503 | A | * | 7/2000 | Isoyama et al. | ............... 429/61 |
| 6,346,343 | B1 |   | 2/2002 | Notten et al. |   |
| 6,346,349 | B1 |   | 2/2002 | Briscoe et al. |   |
| 6,432,584 | B1 |   | 8/2002 | Visco et al. |   |
| 6,680,141 | B2 | * | 1/2004 | Hikmet et al. | ............... 429/129 |

(Continued)

FOREIGN PATENT DOCUMENTS

JP   11-067222   3/1999

(Continued)

OTHER PUBLICATIONS

"Characteristics of a lithium-polymer battery based on a lithium powder anode", C. Kwon, et al., 2001 Elsevier Science B.V., Journal of Power Sources 93, p. 145-150.

(Continued)

*Primary Examiner*—Patrick Ryan
*Assistant Examiner*—Ben Lewis
(74) *Attorney, Agent, or Firm*—Blakely, Sokoloff, Taylor & Zafman LLP

(57) ABSTRACT

There are provided an anode for a lithium metal polymer secondary battery comprising an anodic current collector having a surface on which a plurality of recesses having a predetermined shape are formed and a method of preparing the same. The plurality of recesses are formed on a surface of the anodic current collector using a physical method or a chemical method. In a lithium metal polymer secondary battery employing the anode, oxidation/reduction of lithium and the formation of dendrite occur only in the recesses formed by surface patterning of the anodic current collector. Thus, expanding and shrinking of a battery due to a change in the thickness of the lithium anode can be prevented and cycling stability and the lifespan of a battery can be improved.

10 Claims, 5 Drawing Sheets

U.S. PATENT DOCUMENTS 6,706,447 B2    3/2004    Gao et al.

FOREIGN PATENT DOCUMENTS

| | | |
|---|---|---|
| JP | 2004-127561 | 4/2004 |
| WO | WO 02/21616 | 3/2002 |

OTHER PUBLICATIONS

"Interfacial enhancement between lithium electrode and polymer electrolytes", N. Choi, et al., 2003 Elsevier Science B.V., Journal of Power Sources 119-121, p. 610-616.

"Effect of carbon dioxide on lithium anode cycleability with various substrates", T. Osaka, et al, 1997 Elsevier Sceince S.A., Journal of Power.

* cited by examiner

ANODE FOR LITHIUM METAL POLYMER SECONDARY BATTERY COMPRISING SURFACE PATTERNED ANODIC CURRENT COLLECTOR AND METHOD OF PREPARING THE SAME

CROSS-REFERENCE TO RELATED PATENT APPLICATION

This application claims the benefit of Korean Patent Application No. 10-2004-0097475, filed on Nov. 25, 2004, in the Korean Intellectual Property Office, the disclosure of which is incorporated herein in its entirety by reference.

BACKGROUND OF THE INVENTION

1. Field of the Invention

The present invention relates to a lithium metal polymer secondary battery and a method of producing the same, and more particularly, to an anode for a lithium metal polymer secondary battery comprising a patterned anodic current collector and a method of preparing the same.

2. Description of the Related Art

As the IT (Information Technology) industry advances, demand for small-sized, thin and light-weight electronic devices rapidly increases. One outstanding change resulting from the development of technology is in the field of office automation, where desktop-type computers are rapidly being substituted by small-sized and light-weight devices such as portable notebook PCs. Also, portable electronic devices, such as cellular phones, are being continuously minimized with complicated and diversified functions.

Thus, high performance lithium secondary batteries for supplying power to the above devices are also required. Currently, one of the lithium secondary batteries most broadly applied to small-sized IT devices is a lithium ion battery (LIB). An LIB can be more easily reduced in size and weight than a conventional Pb storage battery or a Ni—Cd battery, and has a high energy density.

The LIB uses as an anode a carbon-based material having a chemical potential similar to that of metal lithium upon the intercalation/deintercalation of lithium ions. A transition metal oxide such as lithium cobalt oxide ($LiCoO_2$) having a potential 3-4.5 V higher than Lithium is used as a cathode. A liquid electrolyte/separator system is used as an electrolyte.

However, conventional LIBs have limited designs that effectively prevent leakage of a liquid electrolyte and it is well-documented that their performance is limited due to a fundamental limitation in material. Also, the production costs of LIBs are high and it is difficult to obtain a large capacity.

A lithium metal polymer battery (LMPB) has been developed to solve the problems of the conventional LIB and to provide superior performance. The LMPB includes metal lithium rather than the carbon-based material as an anode and a transition metal oxide having an improved capacity compared to the cathode material used as a cathode in the LIB. In particular, a polymer electrolyte is used instead of the conventional liquid electrolyte/separator system, and thus the LMPB has better stability than the LIB and can have various designs and be made larger.

However, even though the LMPB is spotlighted as a future power source, it has poor cycle properties and a short lifespan. A short circuit is caused due to the growth of lithium dendrite on the surface of a lithium anode when charging and cycling performance is degraded due to the presence of an irreversible reaction. Further, lithium clusters or particles released from the anode surface when discharging adversely affect stability.

In addition, due to the formation of lithium dendrite, the thickness of the lithium anode changes, thereby causing expansion, shrinkage or deformation of a cell, which adversely affects the stability and lifespan of a battery.

To solve the above problems, research into preventing the formation of lithium dendrite and direct contact between a lithium anode and an electrolyte through surface modification of the lithium anode has been conducted (for example, U.S. Pat. No. 5,314,765 and U.S. Pat. No. 6,432,584 B1). Such examples somewhat reduce the formation of lithium dendrite. However, as long as the fundamental requirements for the formation of the lithium dendrite is not removed, volumetric deformation caused by expanding and shrinking of a cell due to a change in the thickness of the anode cannot be controlled. In particular, as the capacity or area of a cell increases, this problem becomes more serious.

SUMMARY OF THE INVENTION

The present invention provides an anode for a lithium metal polymer secondary battery having a structure capable of fundamentally preventing volumetric deformation of a cell, since a change in the thickness of the anode does not occur when charging and discharging, and improving cycle stability and the lifespan of the cell.

The present invention also provides a method of preparing an anode for a lithium metal polymer secondary anode which can fundamentally prevent volumetric deformation of a cell, since a change in the thickness of the anode does not occur when charging and discharging, and improve cycle stability and the lifespan of the cell by means of simplified processes.

According to an aspect of the present invention, there is provided an anode for a lithium metal polymer secondary battery including an anodic current collector having a surface on which a plurality of patterned recesses are formed.

The recesses may have various shapes such as polygonal, circular and elliptical shapes. The anodic current collector may be composed of a metal foil or a metal foam.

According to another aspect of the present invention, there is provided a method of preparing an anode for a lithium metal polymer secondary battery, including preparing an anodic current collector and forming a plurality of recesses on a surface of the anodic current collector.

The recesses may be formed using a physical method or a chemical method. When a physical method is used to form recesses, the anodic current collector can be pressed with a patterning frame on which a plurality of patterned protrusions are formed. When a chemical method is used to form recesses, part of the surface of the anodic current collector may be etched with an etchant.

In a lithium metal polymer secondary battery employing the anode according to an embodiment of the present invention, oxidation/reduction of lithium and the formation of dendrite occur only in recesses formed by patterning of an anodic current collector. Thus, expanding and shrinking of a cell due to a change in the thickness of a lithium anode are prevented and cycle stability and the lifespan of the cell are improved.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
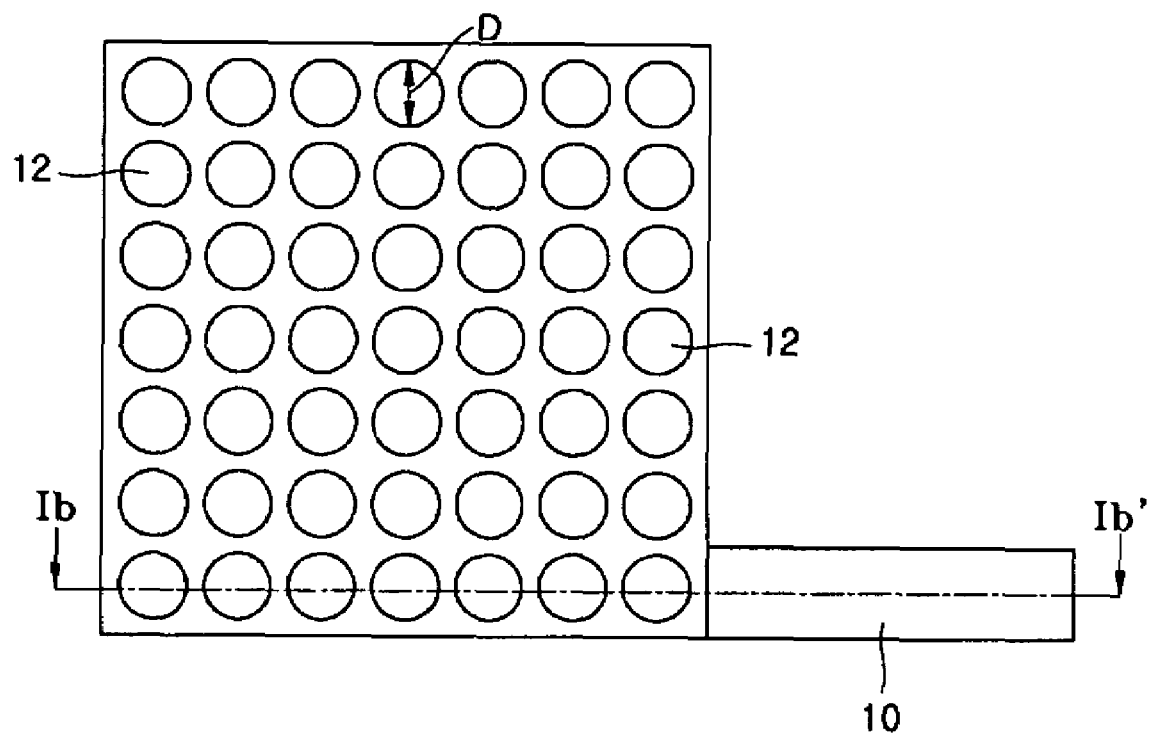
FIG. 1A is a plan view of an anode for a lithium metal polymer secondary battery according to an exemplary embodiment of the present invention.
Figure 1B:
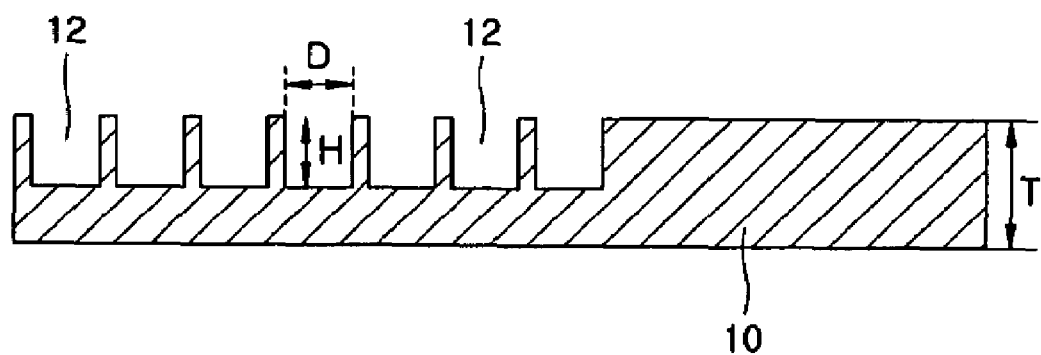
FIG. 1B is a cross-sectional view taken along line lb-lb' of FIG. 1A.

FIG. 1A is a plan view of an anode of a lithium metal polymer secondary battery according to an exemplary embodiment of the present invention and FIG. 1B is a cross-sectional view taken along line lb-lb' of FIG. 1A.

Referring to FIGS. 1A and 1B, the anode for the lithium metal polymer secondary battery includes an anodic current collector 10 having a patterned surface on which a plurality of recesses 12 having a predetermined shape are formed. The recesses 12 may be formed by patterning a surface of the anodic current collector 10 using various methods. Even though FIGS. 1A and 1B illustrate circular-shaped recesses 12, the shape of the recesses 12 is not particularly limited and may be, for example, polygonal such as rectangular or triangular, or elliptical.

The anodic current collector 10 may be composed of a metal foil or a metal foam. The anodic current collector 10 can be composed of Cu or Ni. The anodic current collector 10 may have a thickness T of about 100 nm to 500 μm, and preferably about 1 to 200 μm.

The recesses 12 may have a diameter D of about 1 μm to 3 cm, and preferably 100 μm to 2 cm. The recesses may have a height H of about 0.1 to 300 μm, and preferably about 0.5 to 150 μm.

When the recesses 12 have a rectangular shape, the lengths of the sides may be about 1 μm to 3 cm, and preferably 100 μm to 2 cm.

Figure 2A:
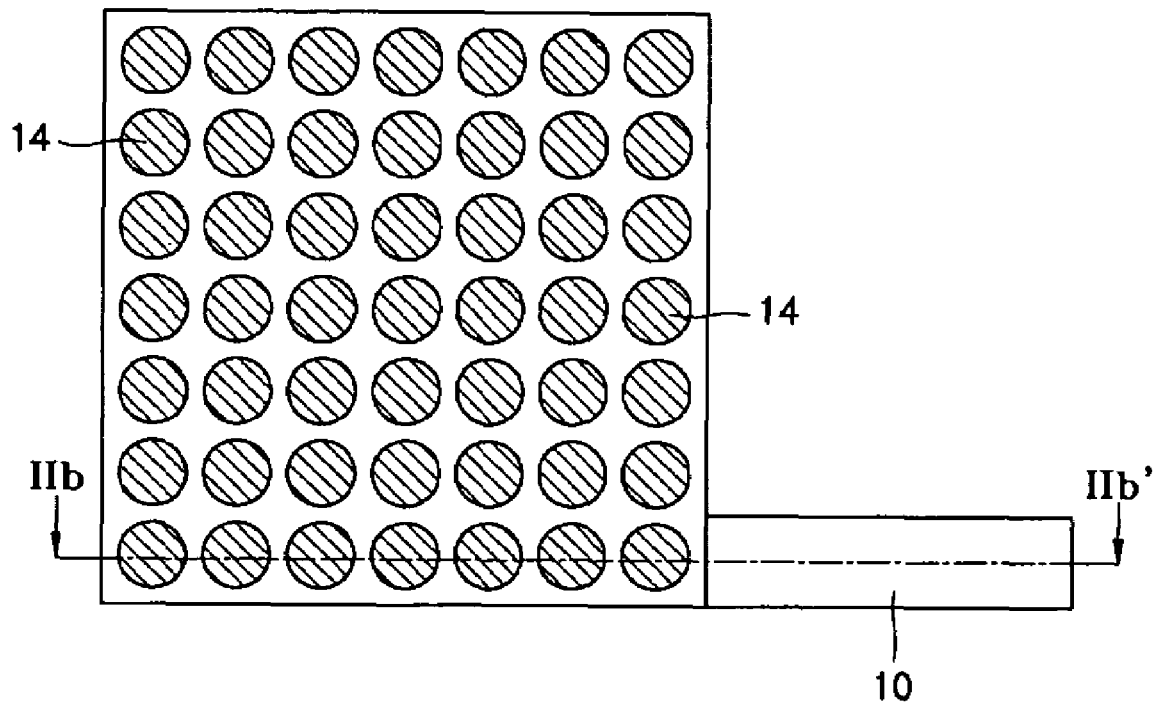
FIG. 2A is a plan view of a lithium metal polymer secondary battery cell employing an anodic current collector according to an embodiment of the present invention as an anode when lithium is filled in recesses by charge and discharge cycling.
Figure 2B:
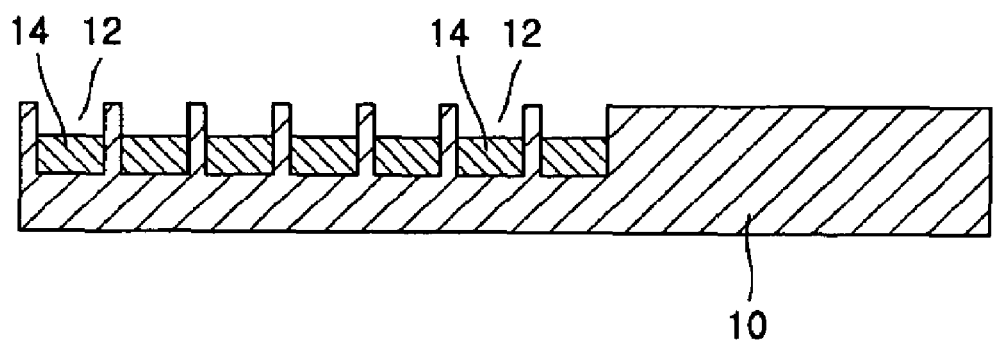
FIG. 2B is a cross-sectional view taken along line llb-llb' of FIG. 2A.

FIG. 2A is a plan view of a lithium metal polymer secondary battery employing the anodic current collector 10 illustrated in FIGS. 1A and 1B as an anode when lithium 14 is filled in the recesses 12 by charge and discharge cycling and FIG. 2B is a cross-sectional view taken along line llb-llb' of FIG. 2A.

Referring to FIGS. 2A and 2B, a film is not deposited on the anodic current collector 10. Instead, lithium 14 is filled in the recesses 12 formed on the surface of the anodic current collector 10 by surface patterning. Thus, even when charge and discharge are repeated, oxidation/reduction of lithium 14 and growth of lithium dendrite occur only within the height H of the recesses 12 of the anodic current collector 10. As a result, there is no increase in the anode thickness and the polymer electrolyte or the separator is not perforated or pushed by the anode, and thus the whole thickness and volume of a battery are not changed. Further, even though morphology of an anode surface is frequently changed, interface resistance does not increase since the lithium 14 does not directly contact an electrolyte film. Thus, short-circuit of a battery can be prevented and cycling stability can be significantly improved.

Figure 3:
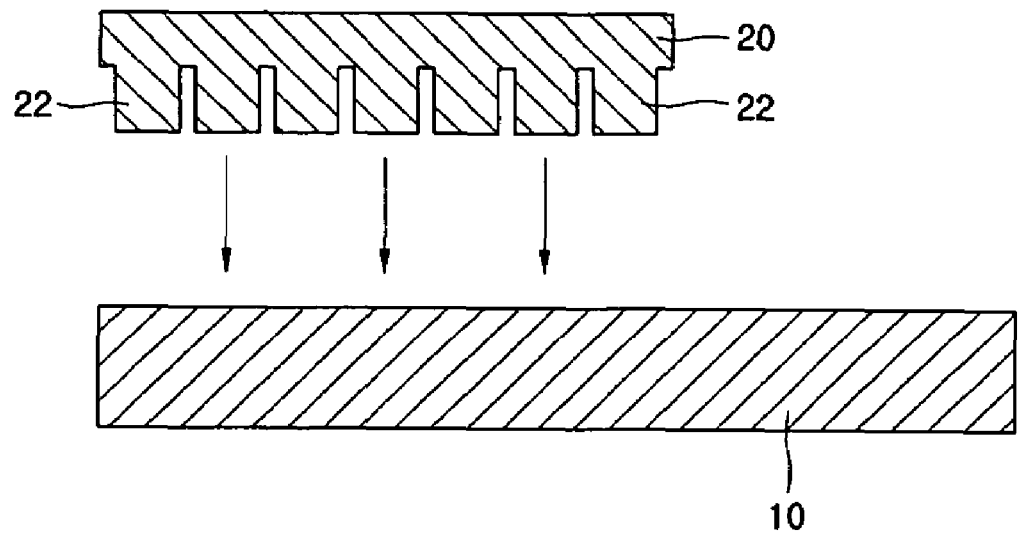
FIG. 3 is a cross-sectional view illustrating a method of preparing an anode for a lithium metal polymer secondary battery according to an embodiment of the present invention.

FIG. 3 is a cross-sectional view illustrating a method of preparing an anode for a lithium metal polymer secondary battery according to an embodiment of the present invention. In the present embodiment, the recesses 12 are physically formed on the anodic current collector 10.

Referring to FIG. 3, the anodic current collector 10 composed of a metal, for example, Cu or Ni, is first prepared. The anodic current collector 10 may be composed of a metal foil or a metal foam.

Then, a patterning frame 20 having a plurality of protrusions 22 having a predetermined shape is prepared.

Next, the anodic current collector 10 is pressed with the patterning frame 20. As a result, the plurality of recesses 12 corresponding to the protrusions 22, are formed on the surface of the anodic current collector 10.

Figure 4A:
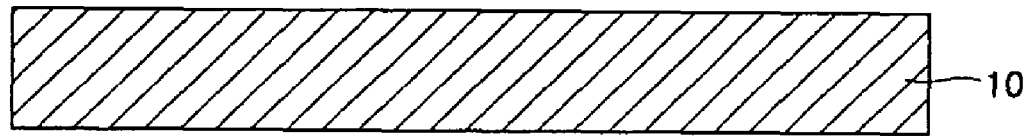
FIGS. 4A through 4C are cross-sectional views sequentially illustrating a method of preparing an anode for a lithium metal polymer secondary battery according to another embodiment of the present invention.
Figure 4B:
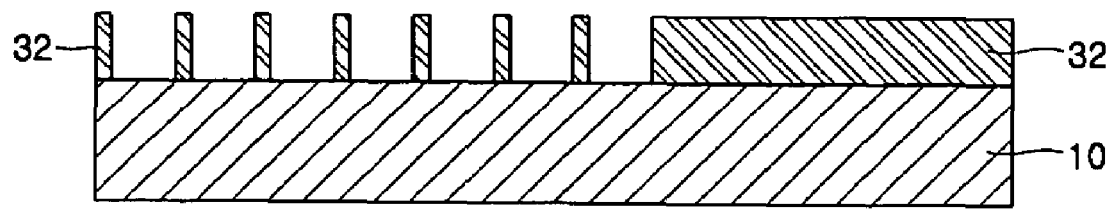
Figure 4C:
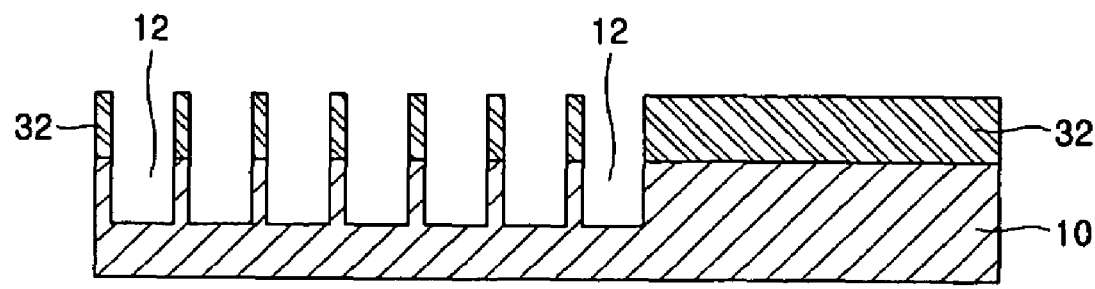

FIGS. 4A through 4C are cross-sectional views sequentially illustrating a method of preparing an anode for a lithium metal polymer secondary battery according to another embodiment of the present invention. In the present embodiment of the present invention, the recesses 12 are chemically formed on the anodic current collector 10.

Referring to FIG. 4A, the anodic current collector 10 is prepared in the same manner as in FIG. 3.

Referring to FIG. 4B, a mask pattern 32 partially exposing a surface of the anodic current collector 10 is formed on the surface of the anodic current collector 10. The mask pattern 32 may be composed of a polymer film. For example, the mask pattern 32 may be composed of high density polyethylene or a polyimide derivative.

Referring to FIG. 4C, the exposed surface of the anodic current collector 10 is etched using the mask pattern 32 as an etching mask to form recesses 12.

When the anodic current collector 10 is composed of Cu, acidic or alkali materials may be used as the etchant. For example, $NH_4Cl$, $H_2SO_4$, HCl or $FeCl_2$ may be used as the etchant.

When the anodic current collector 10 is composed of Ni, acidic materials are effective etchants. For example, $HNO_3$, $H_2SO_4$, $H_3PO_4$ or HF may be used as the etchant.

The present invention will now be described in greater detail with reference to the following examples. The following examples are for illustrative purposes only and are not intended to limit the scope of the invention.

EXAMPLE 1

A Ni tap terminal was attached to a 2 cm×2 cm Cu current collector having a thickness of 50 μm using an ultrasonic welder. The Cu current collector was pressed with a patterning frame to form circular recesses having a diameter of 3 mm on the Cu current collector surface. The obtained recesses had a height of 35 μm.

EXAMPLE 2

An anodic current collector was prepared in the same manner as in Example 1, except that 2.5 mm×2.5 mm rectangular recesses were formed on a Cu current collector.

EXAMPLE 3

Unit cells including the anodic current collectors prepared in Examples 1 and 2 as anodes were prepared. A cathode plate was prepared using a mixture of 80 wt % of Li—Mn—Ni oxide, 12 wt % of a conducting agent and 8 wt % of a binder and a separator/liquid electrolyte system was used as an electrolyte.

COMPARATIVE EXAMPLE

A unit cell was prepared under the same conditions as in Examples 1 and 2, except that a Li anode prepared by depositing a 10 μm thick Li layer on a 15 μm thick Cu current collector was used.

Charge and discharge cycle performance was evaluated for the unit cells prepared in Examples 1 and 2 and Comparative Example. Charge and discharge characteristics were investigated by charging the cells up to 4.8 V at a current of 1 mA (C/5 rate) and then discharging the cells to 3.0 V. Cycling stability was investigated by performing 50 cycles.

Figure 5:
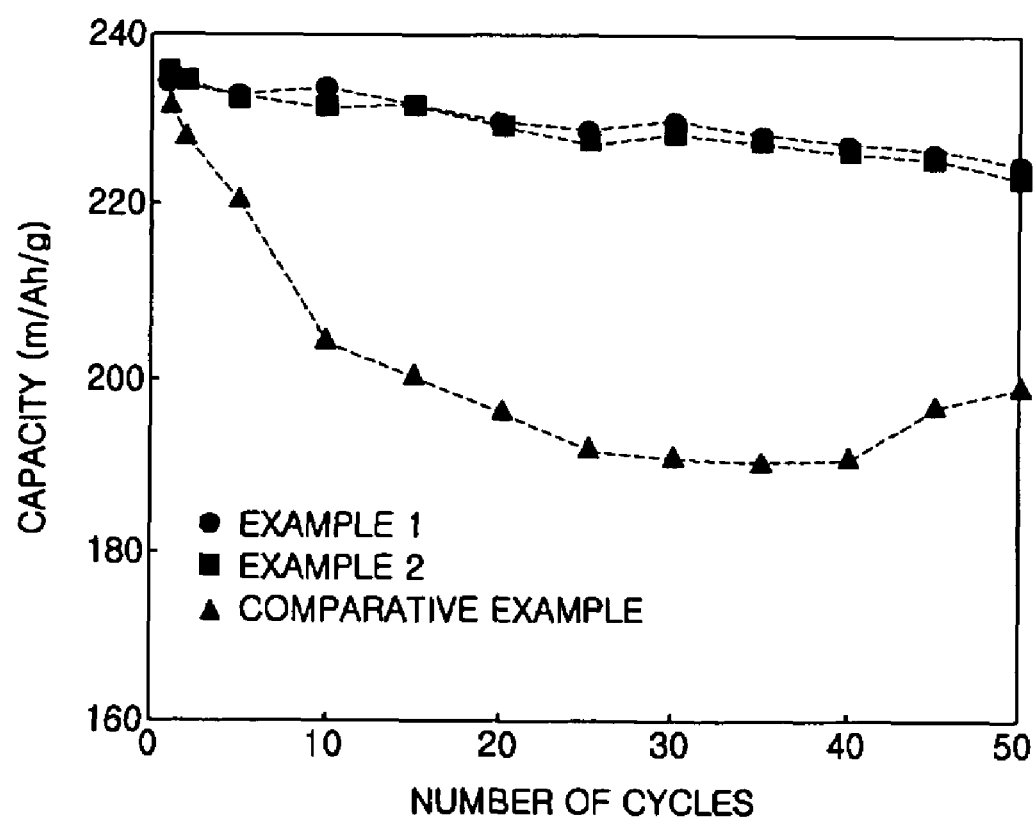
FIG. 5 is a graph Illustrating the cycling performance of lithium metal polymer secondary batteries employing anodes according to embodiments of the present invention and a conventional anode.

FIG. 5 is a graph illustrating the cycling performance of unit cells according to Examples 1 and 2 and Comparative Example. Referring to FIG. 5, it can be seen that unit cells employing the anodes according to Examples 1 and 2 more effectively maintained discharge capacity with respect to cycling than the unit cell of Comparative Example.

Figure 6:
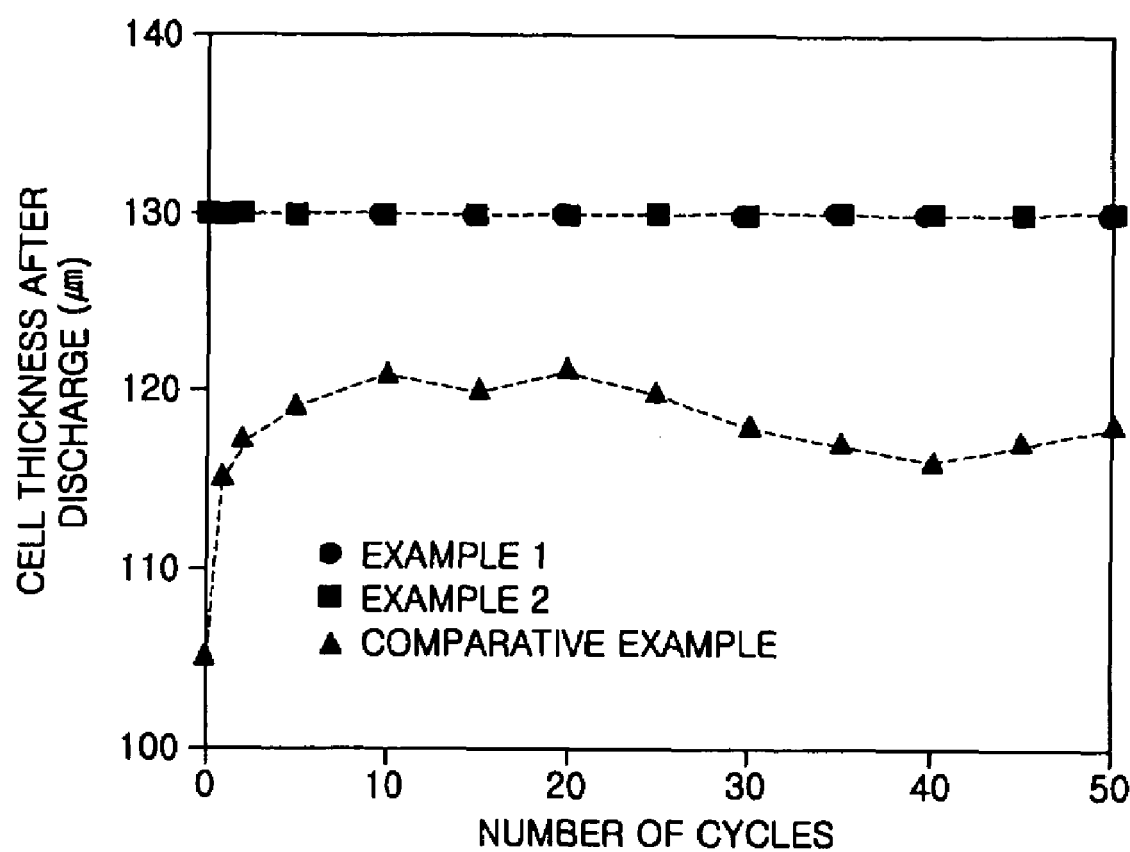
FIG. 6 is a graph of the cell thickness with respect to the number of cycles performed by lithium metal polymer secondary batteries employing anodes according to embodiments of the present invention and a conventional anode.

FIG. 6 is a graph of the cell thickness with respect to the number of cycles performed by the unit cells of Examples 1 and 2 and Comparative Example. Referring to FIG. 6, the unit cells employing anodes according to Examples 1 and 2 had a nearly constant cell thickness compared to the unit cell of Comparative Example, indicating that the problem of a change in the cell volume due to a change in the Li anode thickness was improved.

The anode for a lithium metal polymer secondary battery according to an embodiment of the present invention includes an anodic current collector on which a plurality of recesses that can have various sizes and shapes are formed. That is, the anode for a lithium metal polymer secondary battery includes patterned anodic current collector rather than a lithium anode. In the lithium metal polymer secondary battery employing the anode according to an embodiment of the present invention, oxidation/reduction of lithium and formation of dendrite occur only in the recesses formed by surface patterning of the anodic current collector. Thus, expanding and shrinking of a cell due to a change in the thickness of the lithium anode can be prevented. Thus, grown dendrites cannot penetrate a polymer electrolyte or a separator and short-circuit or peeling of an electrode surface from the anode do not occur. Further, even if the morphology of the anode surface is frequently changed, interface resistance does not increase since lithium does not directly contact with an electrolyte film. Thus, cycling stability and the lifespan of the battery can be improved.

The anode for a lithium metal polymer secondary battery according to embodiments of the present invention can be applied to various batteries, for example, ultrathin and thick batteries and small unit cells and large stacked/wound cells. Further, the method of preparing an anode for a lithium metal polymer secondary battery according to embodiments of the present invention is simple and can be easily performed, and thus can be easily applied without significant modification of conventional processes.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An anode for a lithium metal polymer secondary battery consisting of an anodic current collector having a surface on which a plurality of recesses having a predetermined shape are formed, wherein only the plurality of recesses are filled with lithium by charge and discharge cycling of the lithium metal polymer secondary battery.

2. The anode of claim 1, wherein the recesses have a polygonal, circular or elliptical shape.

3. The anode of claim 1, wherein the anodic current collector is composed of a metal foil or a metal foam.

4. The anode of claim 3, wherein the anodic current collector is composed of Cu or Ni.

5. A method of preparing an anode for a lithium metal polymer secondary battery comprising: preparing an anodic current collector; and forming a plurality of recesses on a surface of the anodic current collector, wherein only the plurality of recesses are filled with lithium by charge and discharge cycling of the lithium metal polymer secondary battery and the anode includes only the anodic current collector having the plurality of recesses.

6. The method of claim 5, wherein the anodic current collector is composed of a metal foil or a metal foam.

7. The method of claim 5, wherein the recesses are physically formed.

8. The method of claim 7, wherein anodic current collector is pressed with a patterning frame having a plurality of protrusions to form the recesses.

9. The method of claim 5, wherein the recesses are chemically formed.

10. The method of claim 9, wherein part of a surface of the anodic current collector is etched with an etchant to form the recesses.

* * * * *